(12) United States Patent
Little et al.

(10) Patent No.: US 7,104,445 B2
(45) Date of Patent: Sep. 12, 2006

(54) CONTENT PROTECTION TICKET SYSTEM AND METHOD

(75) Inventors: Herbert A. Little, Waterloo (CA); Neil P. Adams, Waterloo (CA); Michael S. Brown, Waterloo (CA); Jonathan F. Hammell, Dobbinton (CA); Michael G. Kirkup, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 11/065,880

(22) Filed: Feb. 25, 2005

(65) Prior Publication Data

US 2005/0242175 A1    Nov. 3, 2005

Related U.S. Application Data

(60) Provisional application No. 60/567,158, filed on Apr. 30, 2004.

(51) Int. Cl.
    *G06K 5/00* (2006.01)
(52) U.S. Cl. .................................................. 235/382
(58) Field of Classification Search ................ 235/382
    See application file for complete search history.

(56) References Cited

U.S. PATENT DOCUMENTS 5,812,945 A * 9/1998 Hansen et al. ............... 455/403
6,259,908 B1 * 7/2001 Austin ......................... 455/411
6,353,888 B1 * 3/2002 Kakehi et al. ............... 713/168
2002/0048369 A1 4/2002 Ginter et al.
2002/0173295 A1 * 11/2002 Nykanen et al. ............ 455/414
2003/0120957 A1 * 6/2003 Pathiyal ....................... 713/202

FOREIGN PATENT DOCUMENTS

CA    2406010        10/2001
CA    2411434 A1     5/2003
EP    1303075 A1     4/2003

OTHER PUBLICATIONS

International Search Report of Application No. PCT/CA2005/000277, date of mailing Jun. 2, 2005—13 pgs.

* cited by examiner

*Primary Examiner*—Thien M. Le
*Assistant Examiner*—Tae W. Kim
(74) *Attorney, Agent, or Firm*—Jones Day; Krishna K. Pathiyal; Robert C. Liang

(57) ABSTRACT

Systems and methods for providing access to data. When an application needs to perform an action that requires access to data, the application acquires a "ticket" in order to access the data. While the application holds the ticket, it is given access to the data.

25 Claims, 7 Drawing Sheets

CONTENT PROTECTION TICKET SYSTEM AND METHOD

CROSS-REFERENCE TO RELATED APPLICATIONS

This application claims priority to and the benefit of commonly assigned U.S. Provisional Application having Ser. No. 60/567,158, filed on Apr. 30, 2004, entitled "CONTENT PROTECTION TICKET SYSTEM AND METHOD," which is hereby incorporated by reference in its entirety for all purposes.

BACKGROUND

1. Technical Field

The present invention relates generally to the field of communications, and in particular to protecting content on mobile wireless communications devices.

2. Description of the Related Art

Many mobile devices contain data that would be considered "sensitive," such as the contents of e-mail messages, names and e-mail addresses of contacts, the times and locations of meetings, etc. As a result, existing methods may be used to protect the user's sensitive data when the device is in a "locked" state by storing this data in an encrypted form in the user's file system.

If the user's data is completely encrypted when the user's device is locked, applications on the device cannot have access to the data when the device is locked. Otherwise, if there could at any time be data in the user's file system that is not encrypted, the device cannot be truly deemed securely "locked".

This effectively forces all applications on the device to stop what they are doing when the device enters a "locked" state, since they will no longer be able to access their data. For example, if an application is in the process of sorting a list of sensitive data, it will not be able to continue with the sorting operation until the device is unlocked. This could increase the complexity of the application considerably, since it would have to take the "lock state" of the device into consideration when determining when any operation could take place and since a device lock can be initiated at any time (e.g., by a timeout, or manually by the user).

SUMMARY

In accordance with the teachings provided herein, systems and methods are provided for providing access to sensitive data. As an example of a system and method, when an application needs to perform an action that requires access to sensitive data, the application acquires a "ticket" in order to access the data. So long as the application holds the ticket, it will be given access to sensitive data.

Another example of a method and system may include a ticket being requested in order to receive access to data stored on the device. A ticket is received from the device and is used to access the data stored on the device.

Another example could involve issuing a ticket to a requestor responsive to a request to access sensitive data and to a lock status associated with the device. Requestors having issued tickets are tracked using a ticket data store. Access is regulated to the sensitive data responsive to possession of a ticket. Requestors can be requested to release any issued tickets in preparation of locking the device. The device receives notice of release of each issued ticket and then can lock the device responsive to receiving notice of release of each issued ticket, wherein the locking disables the device from executing an application until the device is unlocked.

Another example could involve a content protection system having locking instructions executable by a device processor. The locking instructions are configured to receive a device lock request for placing the device in a locked state. Ticketing instructions executable by the device processor can be configured to receive a request for a ticket. The ticket can be used to access sensitive data stored on the device. The ticketing instructions are configured to provide a ticket to the requestor based upon whether the device is locked and based upon whether a device lock request for the device has been received by the locking instructions. The ticketing instructions are configured to hold the request responsive to determining that the device is locked or a device lock request has been received, and to respond to the ticket request when the device is unlocked.

As will be appreciated, the disclosed systems and methods are capable of modifications in various respects. Accordingly, the drawings and description set forth below are to be regarded as illustrative in nature and not restrictive.

DETAILED DESCRIPTION OF THE DRAWINGS

Figure 1:
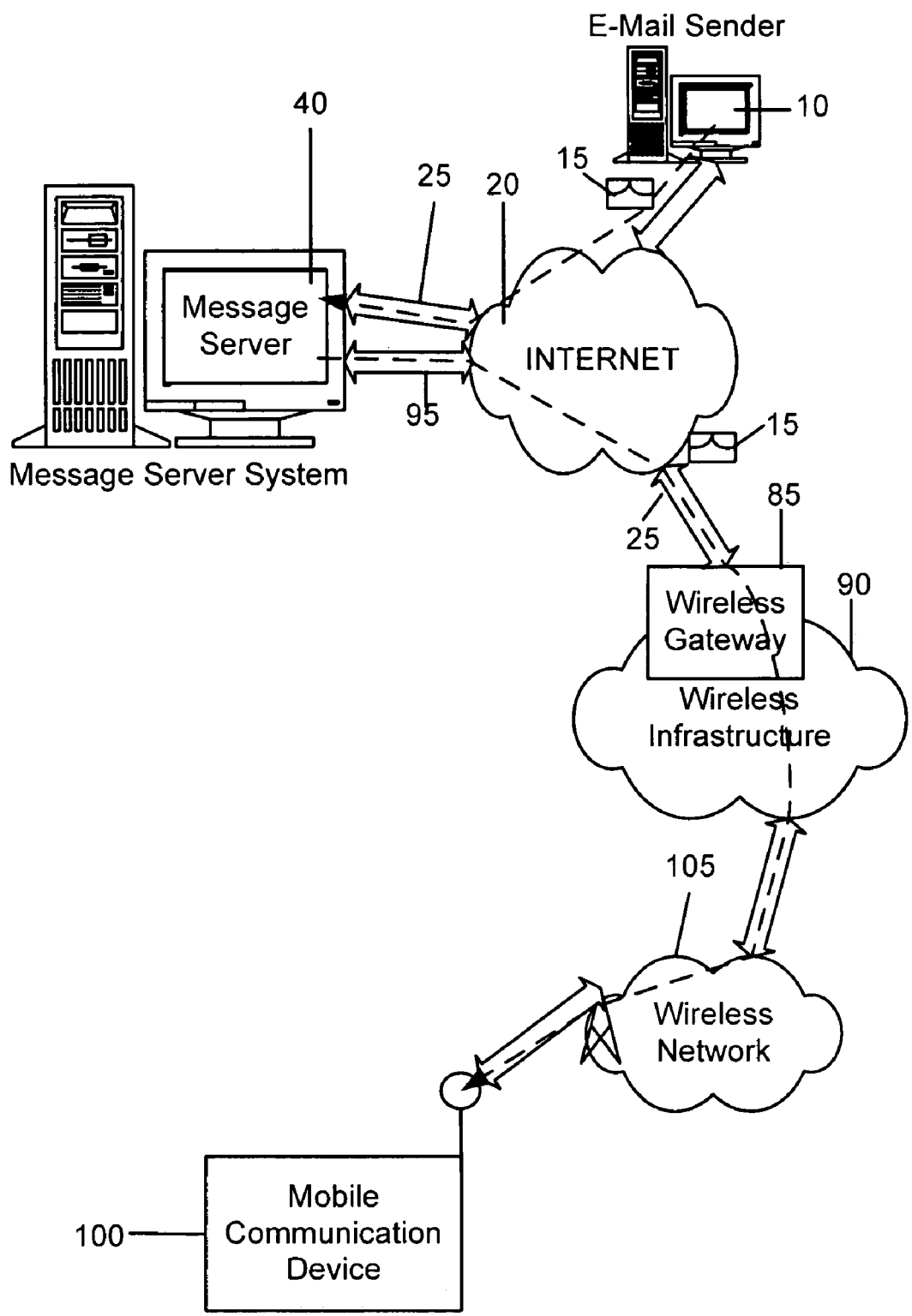
FIG. 1 is an overview of an example communication system in which a wireless communication device may be used.

FIG. 1 is an overview of an example communication system in which a wireless communication device may be used. One skilled in the art will appreciate that there may be hundreds of different topologies, but the system shown in FIG. 1 helps demonstrate the operation of the encoded message processing systems and methods described in the present application. There may also be many message senders and recipients. The simple system shown in FIG. 1 is for illustrative purposes only, and shows perhaps the most prevalent Internet e-mail environment where security is not generally used.

FIG. 1 shows an e-mail sender 10, the Internet 20, a message server system 40, a wireless gateway 85, wireless infrastructure 90, a wireless network 105 and a mobile communication device 100.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have predefined database formats for data like calendars, to-do lists, task lists, e-mail and documentation.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a composed e-mail message 15 is sent by the e-mail sender 10, located somewhere on the Internet 20. This message 15 is normally fully in the clear and uses traditional Simple Mail Transfer Protocol (SMTP), RFC822 headers and Multipurpose Internet Mail Extension (MIME) body parts to define the format of the mail message. These techniques are all well known to those skilled in the art. The message 15 arrives at the message server 40 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment described in further detail below, messages addressed to a message server account associated with a host system such as a home computer or office computer which belongs to the user of a mobile device 100 are redirected from the message server 40 to the mobile device 100 as they are received.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or Ti connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
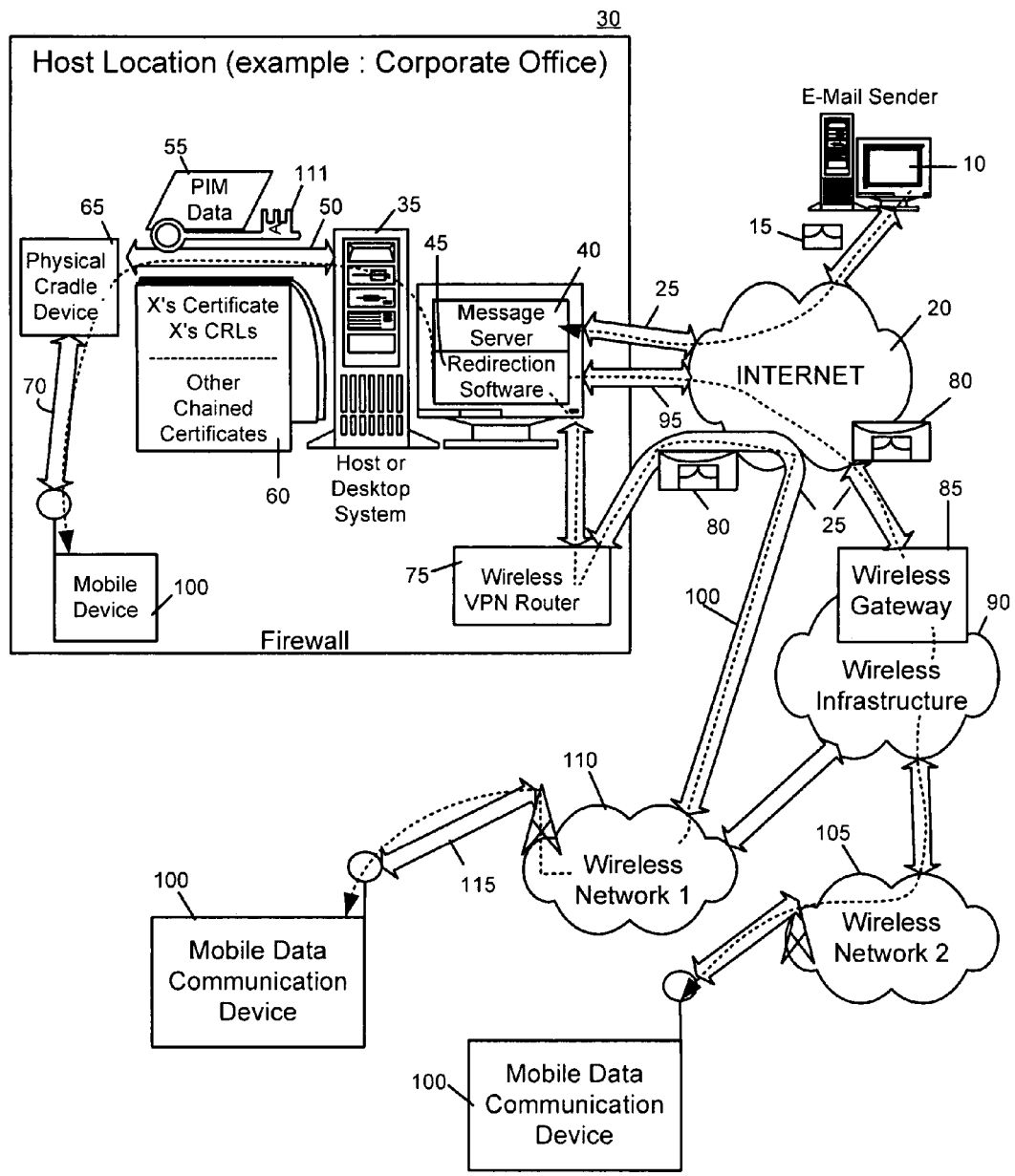
FIG. 2 is a block diagram of a further example communication system including multiple networks and multiple mobile communication devices.

FIG. 2 is a block diagram of a further example communication system including multiple networks and multiple mobile communication devices. The system of FIG. 2 is substantially similar to the FIG. 1 system, but includes a host system 30, a redirection program 45, a mobile device cradle 65, a wireless virtual private network (VPN) router 75, an additional wireless network 110 and multiple mobile communication devices 100. As described above in conjunction with FIG. 1, FIG. 2 represents an overview of a sample network topology. Although the encoded message processing systems and methods described herein may be applied to networks having many different topologies, the network of FIG. 2 is useful in understanding an automatic e-mail redirection system mentioned briefly above.

The central host system 30 will typically be a corporate office or other LAN, but may instead be a home office computer or some other private system where mail messages are being exchanged. Within the host system 30 is the message server 40, running on some computer within the firewall of the host system, that acts as the main interface for the host system to exchange e-mail with the Internet 20. In the system of FIG. 2, the redirection program 45 enables redirection of data items from the server 40 to a mobile communication device 100. Although the redirection program 45 is shown to reside on the same machine as the message server 40 for ease of presentation, there is no requirement that it must reside on the message server. The redirection program 45 and the message server 40 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of the redirection software 45 may be found in the commonly assigned U.S. Pat. No. 6,219,694 ("the '694 patent"), entitled "System and Method for Pushing Information From A Host System To A Mobile Data Communication Device Having A Shared Electronic Address", and issued to the assignee of the instant application on Apr. 17, 2001, which is hereby incorporated into the present application by reference. This push technique may use a wireless friendly encoding, compression and encryption technique to deliver all information to a mobile device, thus effectively extending the security firewall to include each mobile device 100 associated with the host system 30.

As shown in FIG. 2, there may be many alternative paths for getting information to the mobile device 100. One method for loading information onto the mobile device 100 is through a port designated 50, using a device cradle 65. This method tends to be useful for bulk information updates often performed at initialization of a mobile device 100 with the host system 30 or a computer 35 within the system 30. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. The concept of a wireless VPN router 75 is new in the wireless industry and implies that a VPN connection could be established directly through a specific wireless network 110 to a mobile device 100. The possibility of using a wireless VPN router 75 has only recently been available and could be used when the new Internet Protocol (IP) Version 6 (IPV6) arrives into IP-based wireless networks. This new protocol will provide enough IP addresses to dedicate an IP address to every mobile device 100 and thus make it possible to push information to a mobile device 100 at any time. A principal advantage of using this wireless VPN router 75 is that it could be an off-the-shelf VPN component, thus it would not require a separate wireless gateway 85 and wireless infrastructure 90 to be used. A VPN connection would preferably be a Transmission Control Protocol (TCP)/IP or User Datagram Protocol (UDP)/IP connection to deliver the messages directly to the mobile device 100. If a wireless VPN 75 is not available then a link 95 to the Internet 20 is the most common connection mechanism available and has been described above.

In the automatic redirection system of FIG. 2, a composed e-mail message 15 leaving the e-mail sender 10 arrives at the message server 40 and is redirected by the redirection program 45 to the mobile device 100. As this redirection takes place the message 15 is re-enveloped, as indicated at 80, and a possibly proprietary compression and encryption algorithm can then be applied to the original message 15. In this way, messages being read on the mobile device 100 are no less secure than if they were read on a desktop workstation such as 35 within the firewall. All messages exchanged between the redirection program 45 and the mobile device 100 preferably use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the mobile device 100 allows the received message to appear as though the message originated from the user's desktop system 35 rather than the mobile device 100.

With reference back to the port 50 and cradle 65 connectivity to the mobile device 100, this connection path offers many advantages for enabling one-time data exchange of large items. For those skilled in the art of personal digital assistants (PDAs) and synchronization, the most common data exchanged over this link is Personal Information Management (PIM) data 55. When exchanged for the first time this data tends to be large in quantity, bulky in nature and requires a large bandwidth to get loaded onto the mobile device 100 where it can be used on the road. This serial link may also be used for other purposes, including setting up a private security key 111 such as an S/MIME or PGP specific private key, the Certificate (Cert) of the user and their Certificate Revocation Lists (CRLs) 60. The private key is preferably exchanged so that the desktop 35 and mobile device 100 share one personality and one method for accessing all mail. The Cert and CRLs are normally exchanged over such a link because they represent a large amount of the data that is required by the device for S/MIME, PGP and other public key security methods.

Figure 3:
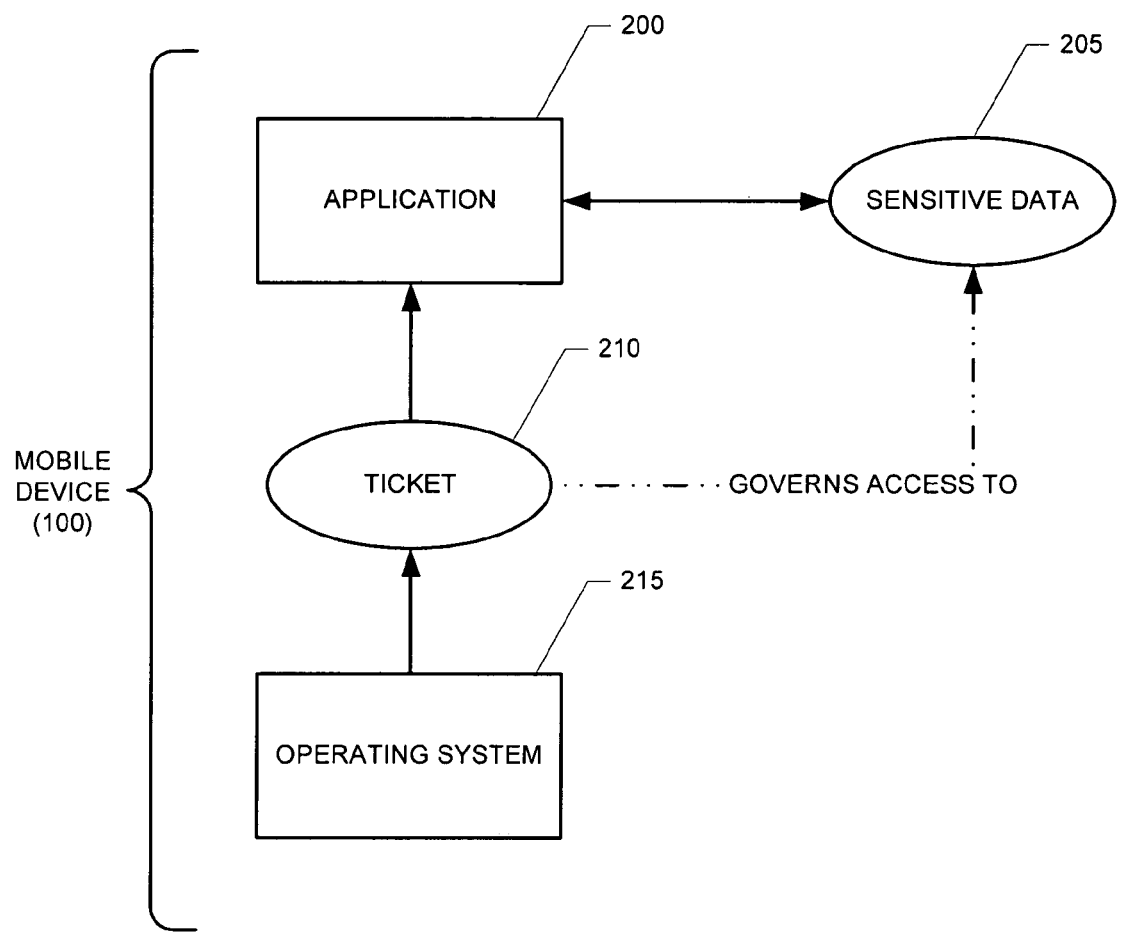
FIGS. 3 and 4 are block diagrams depicting the regulation of access to sensitive content.

FIG. 3 illustrates an approach for regulating access to sensitive data. When an application 200 needs to perform an action that requires access to sensitive data 205, the application 200 requires a "ticket" 210 (e.g., token, etc.) to guarantee it access to the data 205. The application 200 requests ticket 210 from the mobile device, such as through the device's operating system 215. If the device 100 is in an unlocked state, the operating system 215 will return a ticket 210 to the application 200. If the device is in a locked state, the operating system 215 will block the application 200 from running further until the device is unlocked, at which point it will return a ticket 210 to the application 200 and allow it to continue running.

So long as the application 200 holds the ticket 210, it will be given access to sensitive data 205. Even if the user requests that the device be locked, the application 200 will continue to have access to the data 205 until it releases its ticket 210. After the ticket 210 has been released, however, the data 205 will be inaccessible, as though the device is in a locked state. For example, if an application 200 needs to sort its data, it can request a ticket 210 from the operating system 215, and once it has the ticket 210, the application 200 can be assured that it will be able to complete the sorting operation, at which point it can release the ticket 210. Subsequent sorting operations will be blocked at the point at which the application 200 requests a ticket 210, until the device is next unlocked.

Accordingly, the system depicted in the example of FIG. 3 allows applications 200 to complete the actions they are in the process of performing, and to allow them to notify the operating system 215 that they have finished their actions so that the operating system 215 can reliably say that the user's device is "locked". When an indication has been given that the device is to be in a locked state, the applications 200 are requested to release their tickets 210. An application 200 can continue to hold the ticket 210 until after it has completed its accessing of sensitive data (e.g., completed performing a decryption operation involving the sensitive data).

Figure 4:
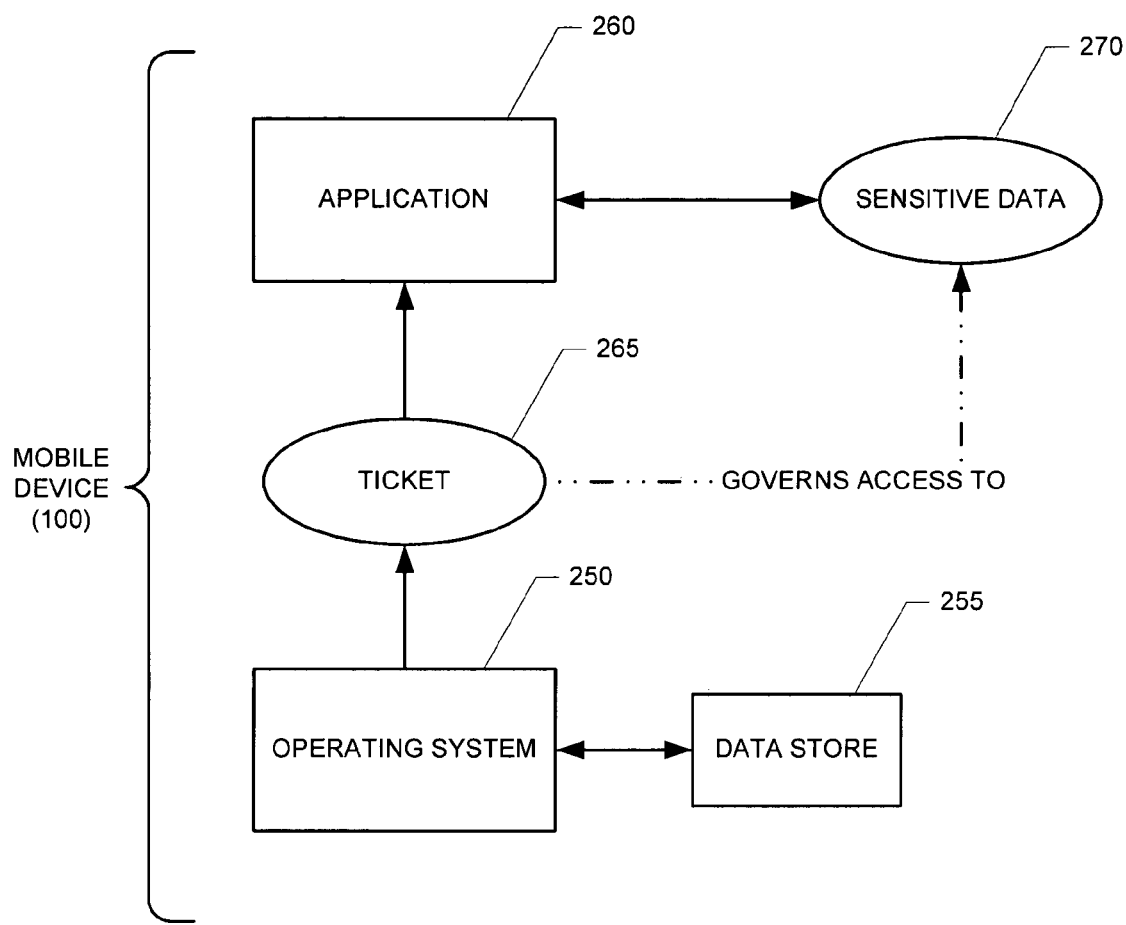

As shown in FIG. 4, the operating system 250 can keep track through a ticket data store 255 of which applications 260 have tickets 265 and will not consider the device to be truly locked until all of the applications 260 on the device have released tickets 265. Once they have all been released, the operating system 250 can reliably say that no application 260 on the device has access to sensitive data 270, and can therefore indicate to the user that the device is securely locked.

Applications 260 are free to acquire tickets at any time. However, a system may be configured such that applications 260 acquire tickets upon receiving notification that the device is to enter into a locked state.

The systems and methods disclosed herein are presented only by way of example and are not meant to limit the scope of the invention. Other variations of the systems and methods described above will be apparent to those skilled in the art and as such are considered to be within the scope of the invention. For example, the systems and methods described herein may be used with many different operational scenarios, such as the operational scenario depicted in FIG. 5.

Figure 5:
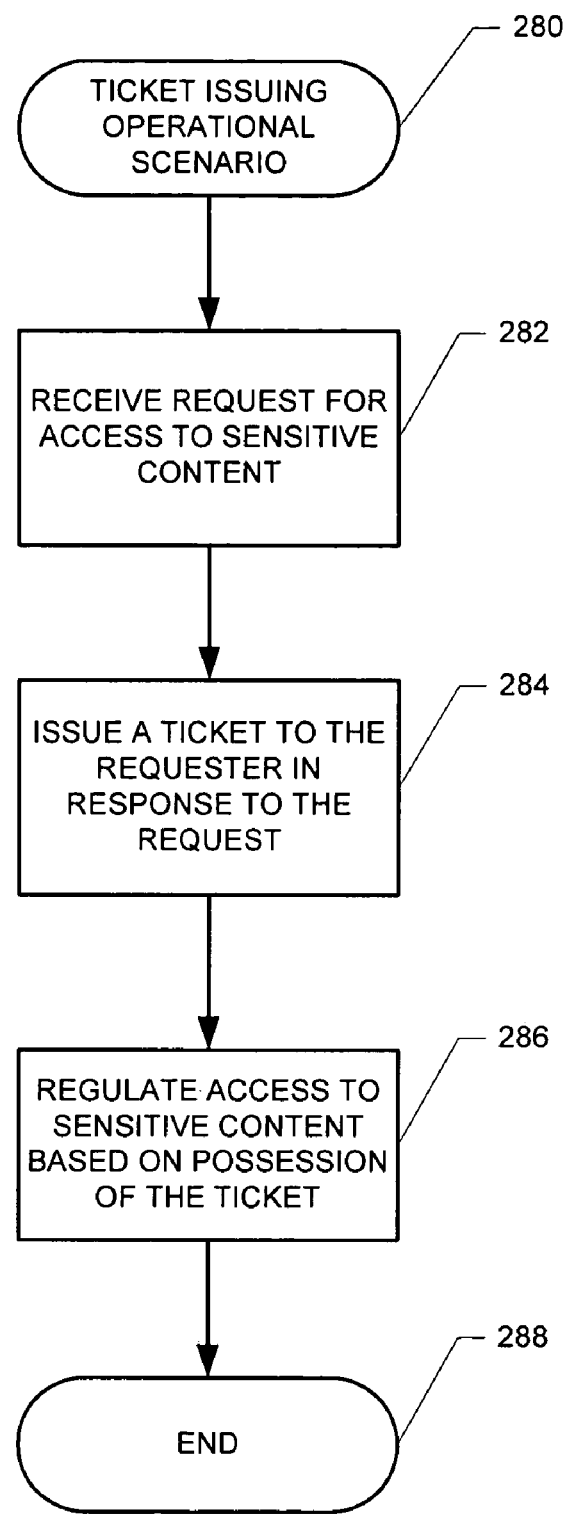
FIG. 5 is a flowchart illustrating an operational scenario for regulating access to sensitive content stored on a device.

FIG. 5 depicts an operational scenario which begins at step 280. At step 282, a request is received from a requester. The request indicates that the requestor would like to access sensitive content. As described above, sensitive content can be the contents of e-mail messages, names and e-mail addresses of contacts, the times and locations of meetings, among many others. The requester can be an application residing on the device, such as, for example, an e-mail application requesting access to an e-mail message.

In step 284, a ticket is issued to the requestor in response to the request to access sensitive content. The ticket enables the requestor to obtain access to sensitive content stored in a device data store. The ticket can be issued by the device processor when the device is in an unlocked state. However, when the device is locked, the device processor can hold the ticket request until the device is unlocked.

As shown in step 286, the device uses the ticket to regulate access to the sensitive content. In this operational scenario, access to the sensitive content is regulated by controlling access to the sensitive content on the data store. A device processor then may require possession of the ticket prior to enabling access to the sensitive content for the requestor.

Figure 6:
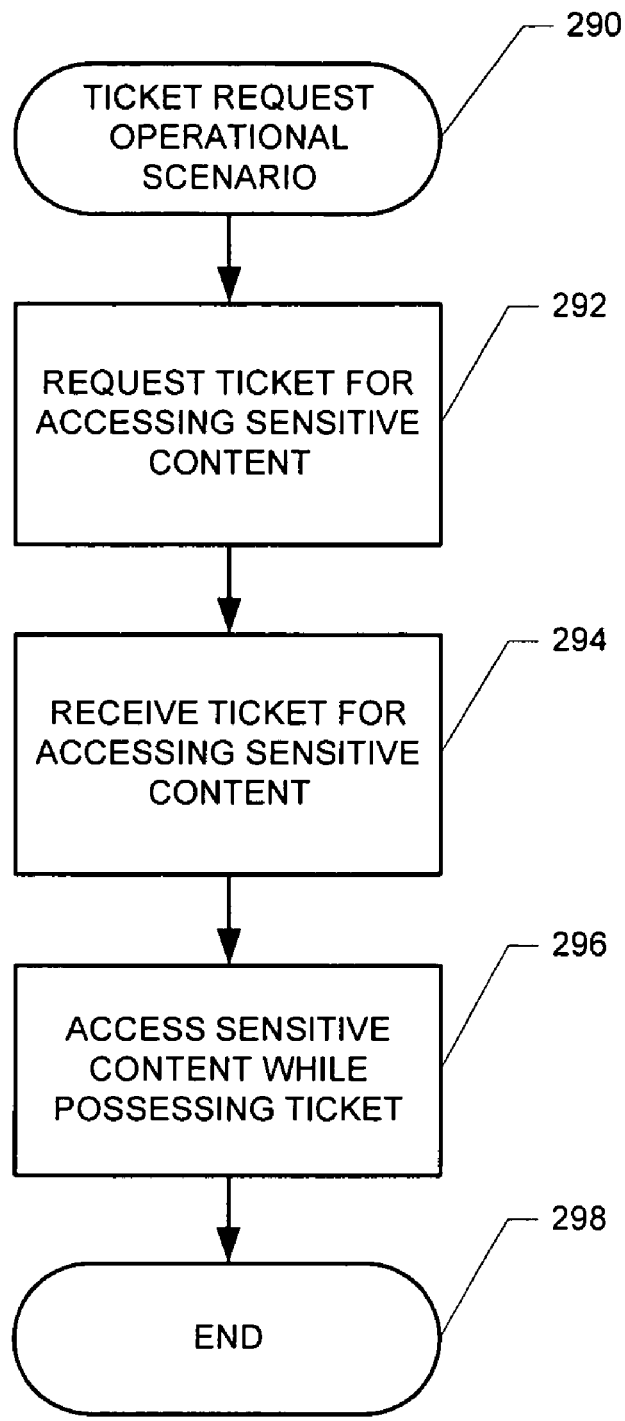
FIG. 6 is a flowchart illustrating an operational scenario involving a requester of sensitive content.

A requestor can acquire a ticket in accordance with the operational scenario shown in FIG. 6. The operational scenario begins at step 290. At step 292, a requestor requests a ticket for accessing sensitive content. As described above, the requester may be an application, such as, for example, an e-mail application requesting access to a message stored on the data store. It should be noted that the request for a ticket could be implicit within a request for access to sensitive information.

In step 294, the requester receives a ticket. The ticket is configured to enable the requestor with the ability to access sensitive content stored on the device. As shown in step 296, the requestor is configured to use the ticket to obtain access to the sensitive content. For example, when access to sensitive content is desired, the requester would provide the ticket to a device processor, the device processor would examine the ticket, and determine whether the requestor possessed a valid ticket for accessing sensitive information from the data store. For example, sensitive information could be encrypted, such that the device processor provides access to the sensitive content upon determining that the requestor possesses a valid ticket. The operational scenario ends at step 298. It should be understood that steps and the order of the steps in the processing of this operational scenarios (and of the other processing flows described herein) may be altered, modified and/or augmented and still achieve the desired outcome.

Figure 7:
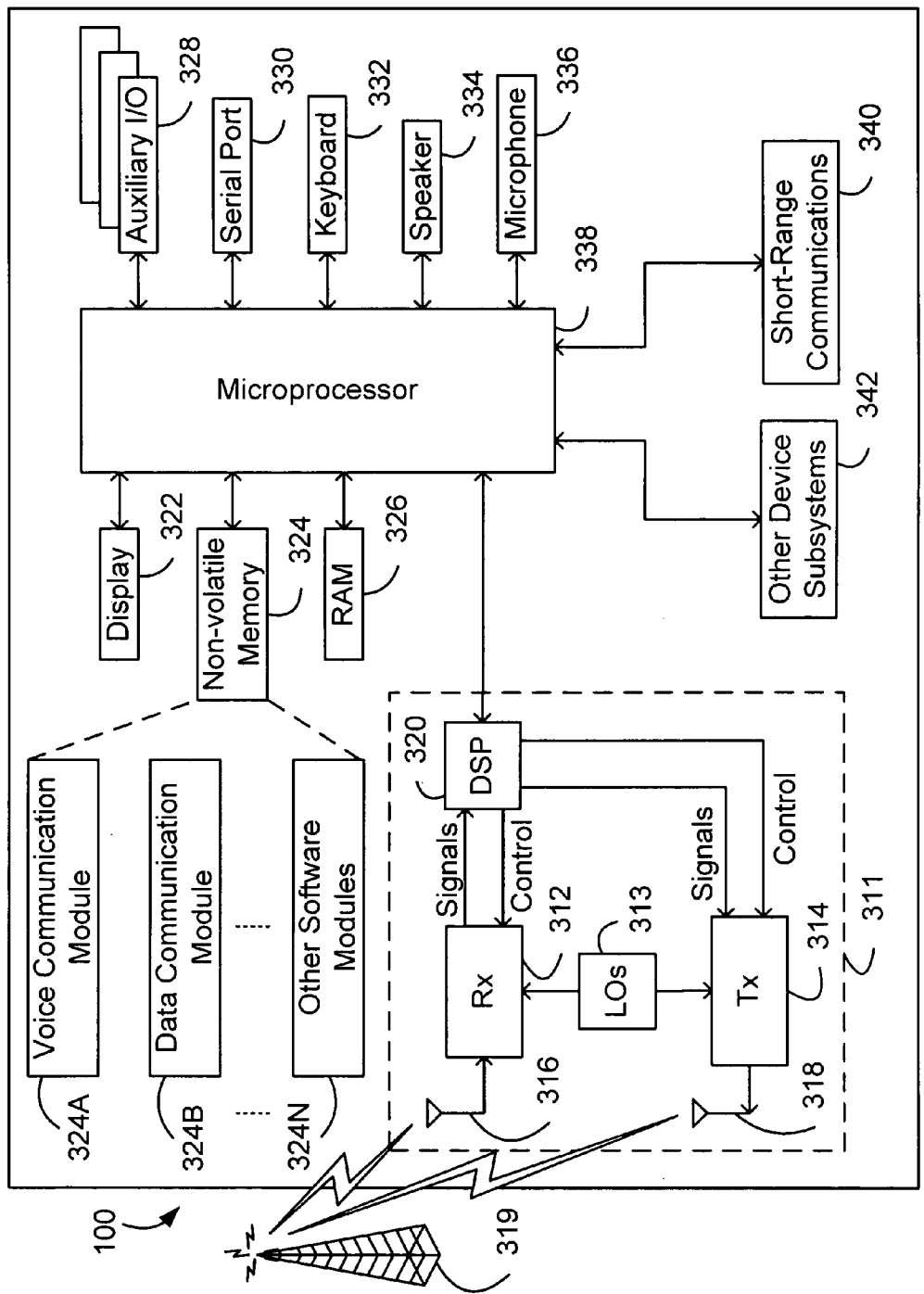
FIG. 7 is a block diagram of an example mobile device.

As another example of the wide scope of the systems and methods disclosed herein, the systems and methods may be used with many different computers and devices, such as a wireless mobile communications device shown in FIG. 7. With reference to FIG. 7, the mobile device 100 is a dual-mode mobile device and includes a transceiver 311, a microprocessor 338, a display 322, non-volatile memory 324, random access memory (RAM) 326, one or more auxiliary input/output (I/O) devices 328, a serial port 330, a keyboard 332, a speaker 334, a microphone 336, a short-range wireless communications sub-system 340, and other device sub-systems 342.

The transceiver 311 includes a receiver 312, a transmitter 314, antennas 316 and 318, one or more local oscillators 313, and a digital signal processor (DSP) 320. The antennas 316 and 318 may be antenna elements of a multiple-element antenna, and are preferably embedded antennas. However, the systems and methods described herein are in no way restricted to a particular type of antenna, or even to wireless communication devices.

The mobile device 100 is preferably a two-way communication device having voice and data communication capabilities. Thus, for example, the mobile device 100 may communicate over a voice network, such as any of the analog or digital cellular networks, and may also communicate over a data network. The voice and data networks are depicted in FIG. 7 by the communication tower 319. These voice and data networks may be separate communication networks using separate infrastructure, such as base stations, network controllers, etc., or they may be integrated into a single wireless network.

The transceiver 311 is used to communicate with the network 319, and includes the receiver 312, the transmitter 314, the one or more local oscillators 313 and the DSP 320. The DSP 320 is used to send and receive signals to and from the transceivers 316 and 318, and also provides control information to the receiver 312 and the transmitter 314. If the voice and data communications occur at a single frequency, or closely-spaced sets of frequencies, then a single local oscillator 313 may be used in conjunction with the receiver 312 and the transmitter 314. Alternatively, if different frequencies are utilized for voice communications versus data communications for example, then a plurality of local oscillators 313 can be used to generate a plurality of frequencies corresponding to the voice and data networks 319. Information, which includes both voice and data information, is communicated to and from the transceiver 311 via a link between the DSP 320 and the microprocessor 338.

The detailed design of the transceiver 311, such as frequency band, component selection, power level, etc., will be dependent upon the communication network 319 in which the mobile device 100 is intended to operate. For example, a mobile device 100 intended to operate in a North American market may include a transceiver 311 designed to operate with any of a variety of voice communication networks, such as the Mobitex or DataTAC mobile data communication networks, AMPS, TDMA, CDMA, PCS, etc., whereas a mobile device 100 intended for use in Europe may be configured to operate with the GPRS data communication network and the GSM voice communication network. Other types of data and voice networks, both separate and integrated, may also be utilized with a mobile device 100.

Depending upon the type of network or networks 319, the access requirements for the mobile device 100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will be unable to carry out any functions involving communications over the data network 319, other than any legally required operations, such as '911' emergency calling.

After any required network registration or activation procedures have been completed, the mobile device 100 may the send and receive communication signals, including both voice and data signals, over the networks 319. Signals received by the antenna 316 from the communication network 319 are routed to the receiver 312, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 320. In a similar manner, signals to be transmitted to the network 319 are processed, including modulation and encoding, for example, by the DSP 320 and are then provided to the transmitter 314 for digital to analog conversion, frequency up conversion, filtering, amplification and transmission to the communication network 319 via the antenna 318.

In addition to processing the communication signals, the DSP 320 also provides for transceiver control. For example, the gain levels applied to communication signals in the receiver 312 and the transmitter 314 may be adaptively controlled through automatic gain control algorithms implemented in the DSP 320. Other transceiver control algorithms could also be implemented in the DSP 320 in order to provide more sophisticated control of the transceiver 311.

The microprocessor 338 preferably manages and controls the overall operation of the mobile device 100. Many types of microprocessors or microcontrollers could be used here, or, alternatively, a single DSP 320 could be used to carry out the functions of the microprocessor 338. Low-level communication functions, including at least data and voice communications, are performed through the DSP 320 in the transceiver 311. Other, high-level communication applications, such as a voice communication application 324A, and a data communication application 324B may be stored in the non-volatile memory 324 for execution by the microprocessor 338. For example, the voice communication module 324A may provide a high-level user interface operable to transmit and receive voice calls between the mobile device 100 and a plurality of other voice or dual-mode devices via the network 319. Similarly, the data communication module 324B may provide a high-level user interface operable for sending and receiving data, such as e-mail messages, files, organizer information, short text messages, etc., between the mobile device 100 and a plurality of other data devices via the networks 319.

The microprocessor 338 also interacts with other device subsystems, such as the display 322, the RAM 326, the auxiliary input/output (I/O) subsystems 328, the serial port 330, the keyboard 332, the speaker 334, the microphone 336, the short-range communications subsystem 340 and any other device subsystems generally designated as 342.

Some of the subsystems shown in FIG. 7 perform communication-related functions, whereas other subsystems may provide "resident" or on-device functions. Notably, some subsystems, such as the keyboard 332 and the display 322 may be used for both communication-related functions, such as entering a text message for transmission over a data communication network, and device-resident functions such as a calculator or task list or other PDA type functions.

Operating system software used by the microprocessor 338 is preferably stored in a persistent store such as non-volatile memory 324. The non-volatile memory 324 may be implemented, for example, as a Flash memory component, or as battery backed-up RAM. In addition to the operating system, which controls low-level functions of the mobile device 310, the non-volatile memory 324 includes a plurality of software modules 324A-324N that can be executed by the microprocessor 338 (and/or the DSP 320), including a voice communication module 324A, a data communication module 324B, and a plurality of other operational modules 324N for carrying out a plurality of other functions. These modules are executed by the microprocessor 338 and provide a high-level interface between a user and the mobile device 100. This interface typically includes a graphical component provided through the display 322, and an input/output component provided through the auxiliary I/O 328, keyboard 332, speaker 334, and microphone 336. The operating system, specific device applications or modules, or parts thereof, may be temporarily loaded into a volatile store, such as RAM 326 for faster operation. Moreover, received communication signals may also be temporarily stored to RAM 326, before permanently writing them to a file system located in a persistent store such as the Flash memory 324.

An exemplary application module 324N that may be loaded onto the mobile device 100 is a personal information manager (PIM) application providing PDA functionality, such as calendar events, appointments, and task items. This module 324N may also interact with the voice communication module 324A for managing phone calls, voice mails, etc., and may also interact with the data communication module for managing e-mail communications and other data transmissions. Alternatively, all of the functionality of the voice communication module 324A and the data communication module 324B may be integrated into the PIM module.

The non-volatile memory 324 preferably also provides a file system to facilitate storage of PIM data items on the device. The PIM application preferably includes the ability to send and receive data items, either by itself, or in conjunction with the voice and data communication modules 324A, 324B, via the wireless networks 319. The PIM data items are preferably seamlessly integrated, synchronized and updated, via the wireless networks 319, with a corresponding set of data items stored or associated with a host computer system, thereby creating a mirrored system for data items associated with a particular user.

Context objects representing at least partially decoded data items, as well as fully decoded data items, are preferably stored on the mobile device 100 in a volatile and non-persistent store such as the RAM 326. Such information may instead be stored in the non-volatile memory 324, for example, when storage intervals are relatively short, such that the information is removed from memory soon after it is stored. However, storage of this information in the RAM 326 or another volatile and non-persistent store is preferred, in order to ensure that the information is erased from memory when the mobile device 100 loses power. This prevents an unauthorized party from obtaining any stored decoded or partially decoded information by removing a memory chip from the mobile device 100, for example.

The mobile device 100 may be manually synchronized with a host system by placing the device 100 in an interface cradle, which couples the serial port 330 of the mobile device 100 to the serial port of a computer system or device. The serial port 330 may also be used to enable a user to set preferences through an external device or software application, or to download other application modules 324N for installation. This wired download path may be used to load an encryption key onto the device, which is a more secure method than exchanging encryption information via the wireless network 319. Interfaces for other wired download paths may be provided in the mobile device 100, in addition to or instead of the serial port 330. For example, a USB port would provide an interface to a similarly equipped personal computer.

Additional application modules 324N may be loaded onto the mobile device 100 through the networks 319, through an auxiliary I/O subsystem 328, through the serial port 330, through the short-range communications subsystem 340, or through any other suitable subsystem 342, and installed by a user in the non-volatile memory 324 or RAM 326. Such flexibility in application installation increases the functionality of the mobile device 100 and may provide enhanced on-device functions, communication-related functions, or both. For example, secure communication applications may enable electronic commerce functions and other such financial transactions to be performed using the mobile device 100.

When the mobile device 100 is operating in a data communication mode, a received signal, such as a text message or a web page download, is processed by the transceiver module 311 and provided to the microprocessor 338, which preferably further processes the received signal in multiple stages as described above, for eventual output to the display 322, or, alternatively, to an auxiliary I/O device 328. A user of mobile device 100 may also compose data items, such as e-mail messages, using the keyboard 332, which is preferably a complete alphanumeric keyboard laid out in the QWERTY style, although other styles of complete alphanumeric keyboards such as the known DVORAK style may also be used. User input to the mobile device 100 is further enhanced with a plurality of auxiliary I/O devices 328, which may include a thumbwheel input device, a touchpad, a variety of switches, a rocker input switch, etc. The composed data items input by the user may then be transmitted over the communication networks 319 via the transceiver module 311.

When the mobile device 100 is operating in a voice communication mode, the overall operation of the mobile device is substantially similar to the data mode, except that received signals are preferably be output to the speaker 334 and voice signals for transmission are generated by a microphone 336. Alternative voice or audio I/O subsystems, such as a voice message recording subsystem, may also be implemented on the mobile device 100. Although voice or audio signal output is preferably accomplished primarily through the speaker 334, the display 322 may also be used to provide an indication of the identity of a calling party, the duration of a voice call, or other voice call related information. For example, the microprocessor 338, in conjunction with the voice communication module and the operating system software, may detect the caller identification information of an incoming voice call and display it on the display 322.

A short-range communications subsystem 340 is also included in the mobile device 100. The subsystem 340 may include an infrared device and associated circuits and components, or a short-range RF communication module such as a Bluetooth™ module or an 802.11 module, for example, to provide for communication with similarly-enabled systems and devices. Those skilled in the art will appreciate that "Bluetooth" and "802.11" refer to sets of specifications, available from the Institute of Electrical and Electronics Engineers, relating to wireless personal area networks and wireless local area networks, respectively.

The systems' and methods' data may be stored in one or more data stores. The data stores can be of many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

What is claimed is:

1. A method of regulating access to sensitive data on a wireless mobile communication device, the method comprising the steps of:
   receiving a request from a requestor, wherein the request is directed to accessing sensitive data stored on the wireless mobile communication device;
   issuing a ticket to the requestor responsive to the request to access sensitive data and a lock status associated with the wireless mobile communication device;
   tracking requestors having issued tickets using a ticket data store;
   regulating access to the sensitive data responsive to possession of a ticket;
   requesting that requestors release any issued tickets in preparation of locking the device;
   receiving notice of release of each issued ticket; and
   locking the device responsive to receiving notice of release of each issued ticket, the device being disabled from executing an application until the device is unlocked.

2. The method of claim 1, further comprising the steps of:
   unlocking the device; and
   responding to ticket requests after the device is unlocked.

3. A content protection system configured to regulate access to sensitive content stored on a wireless mobile communication device, the system comprising:
   locking instructions executable by a device processor; wherein the locking instructions are configured to receive a device lock request for placing the device in a locked state; end
   ticketing instructions executable by the device processor; wherein the ticketing instructions are configured to receive a request for a ticket;
   wherein the ticket is used to access sensitive data stored on the device;
   wherein the ticketing instructions are configured to provide a ticket to the requestor based upon whether the device is locked and based upon whether a device lock request for the device has been received by the locking instructions;
   wherein the ticketing instructions are configured to hold the request responsive to determining that the device is locked or a device lock request has been received, and respond to the ticket request when the device is unlocked.

4. The content protection system of claim 3 further comprising:
   a ticket data store to track any requesters that have tickets.

5. The content protection system of claim 4, wherein the ticketing instructions are further configured to request the release of issued tickets responsive to the locking instructions receiving a device lock request.

6. The content protection system of claim 3, wherein the sensitive data is at least data selected from the group containing e-mail message content contact names and e-mail addresses, or times and locations of meetings.

7. The content protection system of claim 3, wherein the sensitive data comprises encrypted data.

8. The content protection system of claim 7, wherein the encrypted data is decrypted in response to receiving the ticket.

9. The content protection system of claim 7, wherein the encrypted data is no longer accessible by a requestor after the ticket has been released.

10. The content protection system of claim 3, wherein the requestor is an application executing on the device.

11. The content protection system of claim 10, wherein a denial of a ticket request is generated when the device is in a locked state.

12. The content protection system of claim 11, wherein the application is blocked from executing while the device is in thy locked state.

13. The content protection system of claim 12, wherein execution of the application continues when the device is unlocked.

14. The content protection system of claim 3, wherein a requestor receives a notification that the device processor is entering a locked state prior to requesting a ticket from the device processor.

15. The content protection system of claim 3, wherein applications are allowed to complete the actions that the applications are in the process of performing, and wherein the applications are allowed to notify the device's operating system tat the applications have finished their actions so that the device can enter a locked state.

16. The method of claim 1, wherein the sensitive data is at least data selected from the group containing e-mail message content, contact names and e-mail addresses, or times and locations of meetings.

17. The method of claim 1, wherein the sensitive data comprises encrypted data.

18. The method of claim 17, further comprising the step of decrypting the encrypted data responsive to receiving the ticket.

19. The method of claim 17, wherein the encrypted data is no longer accessible by a requestor after the ticket has been released.

20. The method of claim 1, wherein the requester is an application executing on the device.

21. The method of claim 20, further comprising the step of providing a denial of a ticket request when the device is in a locked state.

22. The method of claim 21, further comprising the step of blocking the application from executing while the device is in the locked state.

23. The method of claim 22, further comprising the step of continuing the execution of the application when the device is unlocked.

24. The method of claim 1, wherein a requester receives a notification that the device processor is entering a locked state prior to requesting a ticket from the device processor.

25. The method of claim 1, further comprising allowing applications to complete the actions that the applications are in the process of performing, and allowing the applications to notify the device's operating system that the applications have finished their actions so tat the device can enter a locked state.

* * * * *

UNITED STATES PATENT AND TRADEMARK OFFICE
CERTIFICATE OF CORRECTION

| | | |
|---|---|---|
| PATENT NO. | : 7,104,445 B2 | Page 1 of 1 |
| APPLICATION NO. | : 11/065,880 | |
| DATED | : September 12, 2006 | |
| INVENTOR(S) | : Herbert A. Little et al. | |

It is certified that error appears in the above-identified patent and that said Letters Patent is hereby corrected as shown below:

Column 12, Line 36, change "end" to -- and --

Column 12, Line 54, change "requesters" to -- requestors --

Column 12, Line 61, after "content" insert --,--

Column 13, Line 11, change "thy" to -- the --

Column 13, Line 23, change "tat" to --that --

Column 14, Line 20, change "requester" to -- requestor --

Column 14, Line 27, change "tat" to -- that --

Signed and Sealed this

Fifth Day of December, 2006

JON W. DUDAS
*Director of the United States Patent and Trademark Office*